United States Patent [19]
Kammonen

[11] Patent Number: 6,123,096
[45] Date of Patent: Sep. 26, 2000

[54] PNEUMATIC CARTRIDGE VALVE

[75] Inventor: Jarmo Kammonen, Indal, Sweden

[73] Assignee: Emhart Glass S.A., Cham, Switzerland

[21] Appl. No.: 09/301,663

[22] Filed: Apr. 28, 1999

[30] Foreign Application Priority Data

Apr. 29, 1998 [GB] United Kingdom ............. 9809034

[51] Int. Cl.[7] .................................................. F15B 13/042
[52] U.S. Cl. ............. 137/270; 137/596.18; 137/625.27; 137/625.66; 137/884
[58] Field of Search ............... 137/270, 596.18, 137/625.27, 625.66, 884

[56] References Cited

U.S. PATENT DOCUMENTS 4,377,183 3/1983 Johansson et al. ............. 137/884 X
5,320,130 6/1994 Borbone ............................ 137/270 X

*Primary Examiner*—Gerald A. Michalsky
*Attorney, Agent, or Firm*—Spencer T. Smith

[57] ABSTRACT

A pneumatic cartridge valve has supply inlet and consumer outlet passages provided on the end face of a valve cylinder and a control knob by rotation of which either the flow of air to exhaust or the passage of air from the supply to the consumer may be adjusted.

3 Claims, 5 Drawing Sheets

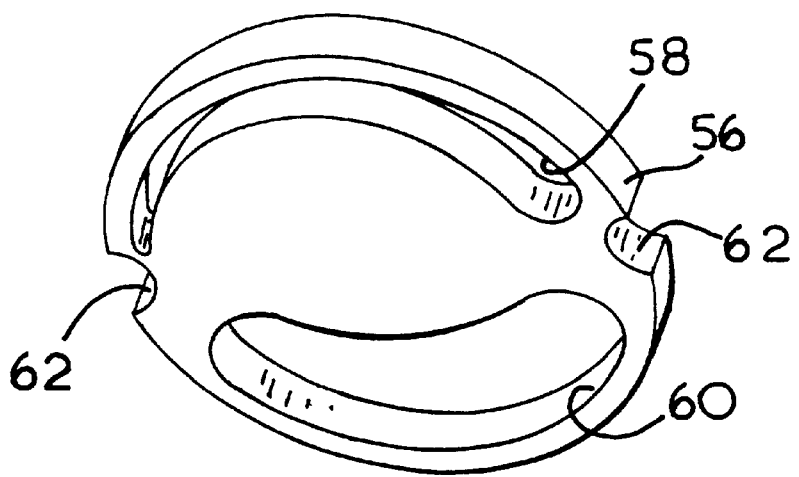
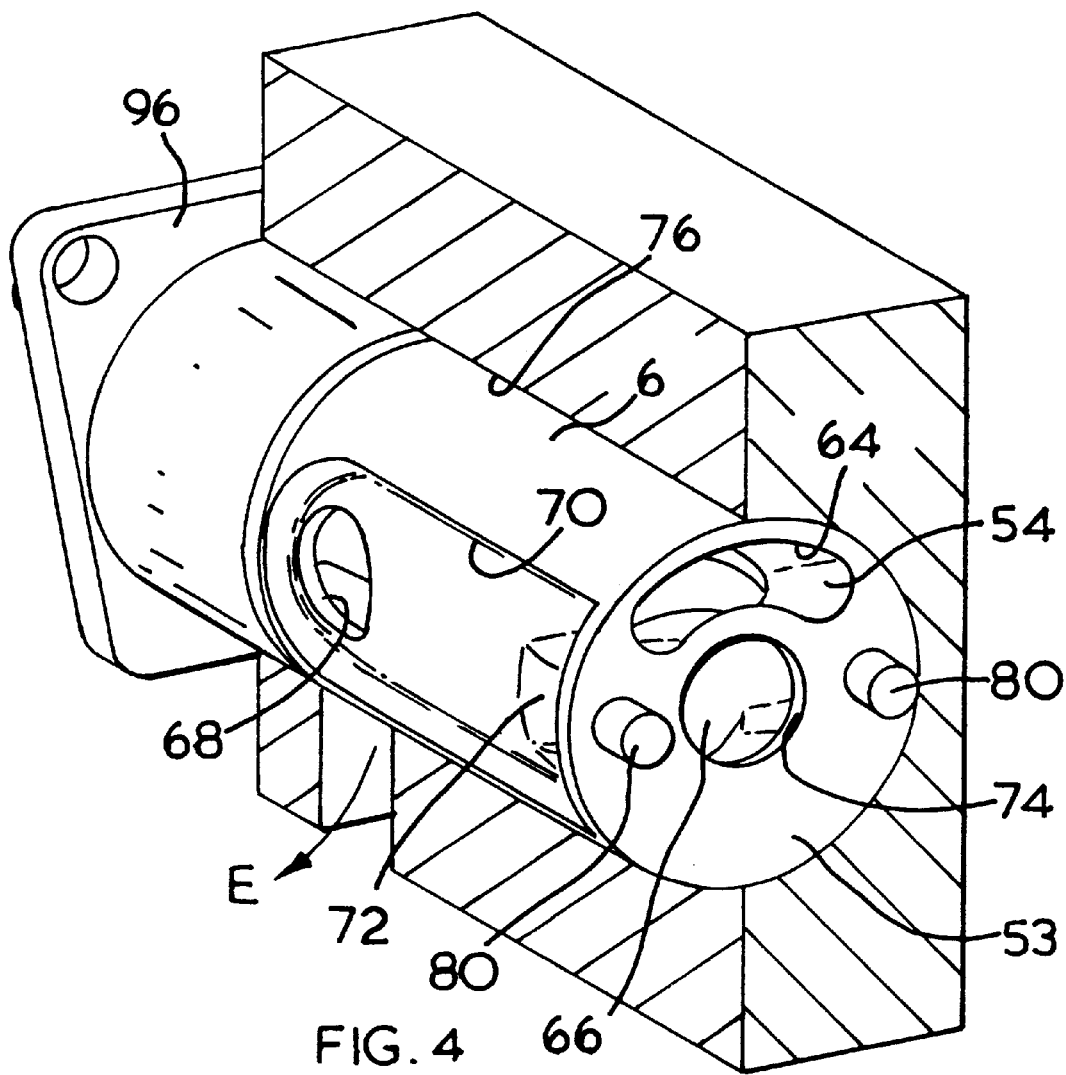

PNEUMATIC CARTRIDGE VALVE

The present invention relates to pneumatic cartridge valves.

BACKGROUND OF THE INVENTION

Pneumatic cartridge valves are utilized in a great number of pneumatically operated mechanisms, for example in glass machines, particularly the well-known I.S. machine.

To operate such mechanisms firstly, at an appropriate time, a supply of compressed air at a controlled pressure must be provided and secondly, again at an appropriate time, air must be exhausted from the mechanism under controlled conditions.

The control of such supply and exhaust to the various mechanisms is often provided by use of a valve block which comprises a number of valves, conventionally an on/off valve for controlling the supply of operating air to the mechanism and for connecting such air to exhaust, and separate restrictor valves to control the rate of supply of operating air to the mechanism and the rate at which air can exhaust. The number of valves leads both to complexity and expense of the valve block.

Valve blocks have been proposed in which cylindrical cavities are provided in the valve block with passages leading to a supply of compressed air and to a consumer of such air opening into an end face of the cavity, with the valve to control the supply of air to the consumer being positioned in such cavity.

OBJECT OF THE INVENTION

It is one of the objects of the present invention to provide a valve of the sort just indicated wherein the rate of flow of air to the consumer or the rate of flow of air to exhaust may be adjusted without recourse to additional restrictor valves.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

In the accompanying drawings:

FIG. 3 shows control plate;

FIG. 4 shows, diagrammatically, a valve according to the invention in position in a valve block;

BRIEF DESCRIPTION OF THE PREFERRED EMBODIMENT

Figure 1:
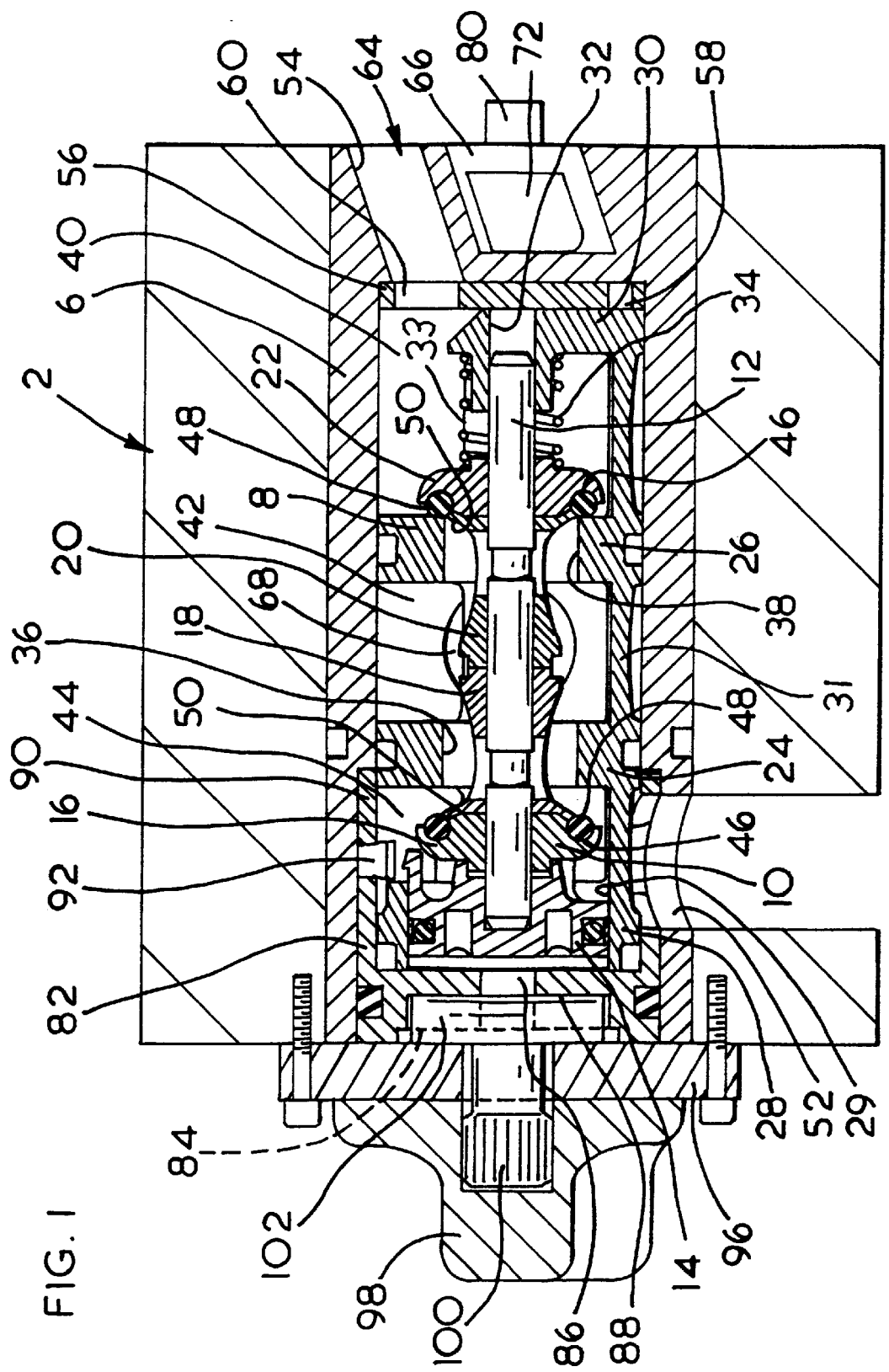
FIG. 1 shows a first valve embodying the invention.

The first valve embodying the invention (FIG. 1) is a pneumatic cartridge valve 2 which is adapted to be mounted in a valve block 4.

The valve 2 comprises a valve cylinder 6 and a valve body 8 positioned in the cylinder 6. Mounted for movement in the valve body 8 is a valve piston 10.

The valve shown in FIG. 1 is a normally closed valve. The valve piston 10 comprises a piston rod 12 which supports an operating piston 14 at one end and, positioned on the rod 12 extending from the piston 14, a first sealing head 16, a first spacer 18, a second spacer 20 and a second sealing head 22.

The valve body 8 comprises a first dividing wall 24 and a second dividing wall 26, an end portion 28 provided with a bore 29 in which the piston 14 is slidably moveable and an opposite end portion 30 having a bore 32 in which the piston rod 12 is slidably moveable. A spring 34 acts between the end portion 30 and the second sealing head 22 to urge the valve piston 10 to the left (viewing FIG. 1) into a normally closed position.

The wall 24 comprises an axial aperture 36 through which the valve piston 10 passes, and the wall 26 comprises a similar aperture 38. The dividing walls 24, 26 divide the valve cylinder 6 into three chambers, an inlet chamber 40, an outlet chamber 42 and an exhaust chamber 44. As can be seen from FIG. 1, in the normally closed position of the valve, the sealing head 22 is urged into engagement with the wall 26 to seal the inlet chamber 40 from the outlet chamber 42, while the outlet chamber 42 is connected to the exhaust chamber 44 through the aperture 36.

Each of the sealing heads 16, 22 comprises a circumferential groove 46 in which a sealing ring 48 is positioned. When the sealing head is closing an aperture in one of the dividing walls, the sealing ring 48 seats around the aperture. The spacers 18, 20 each comprise a body with a dished end 50 which, when the spacers and sealing heads are assembled on the piston rod 12, engages the sealing ring 48 on the respective sealing head and holds the ring in position.

Figure 2:
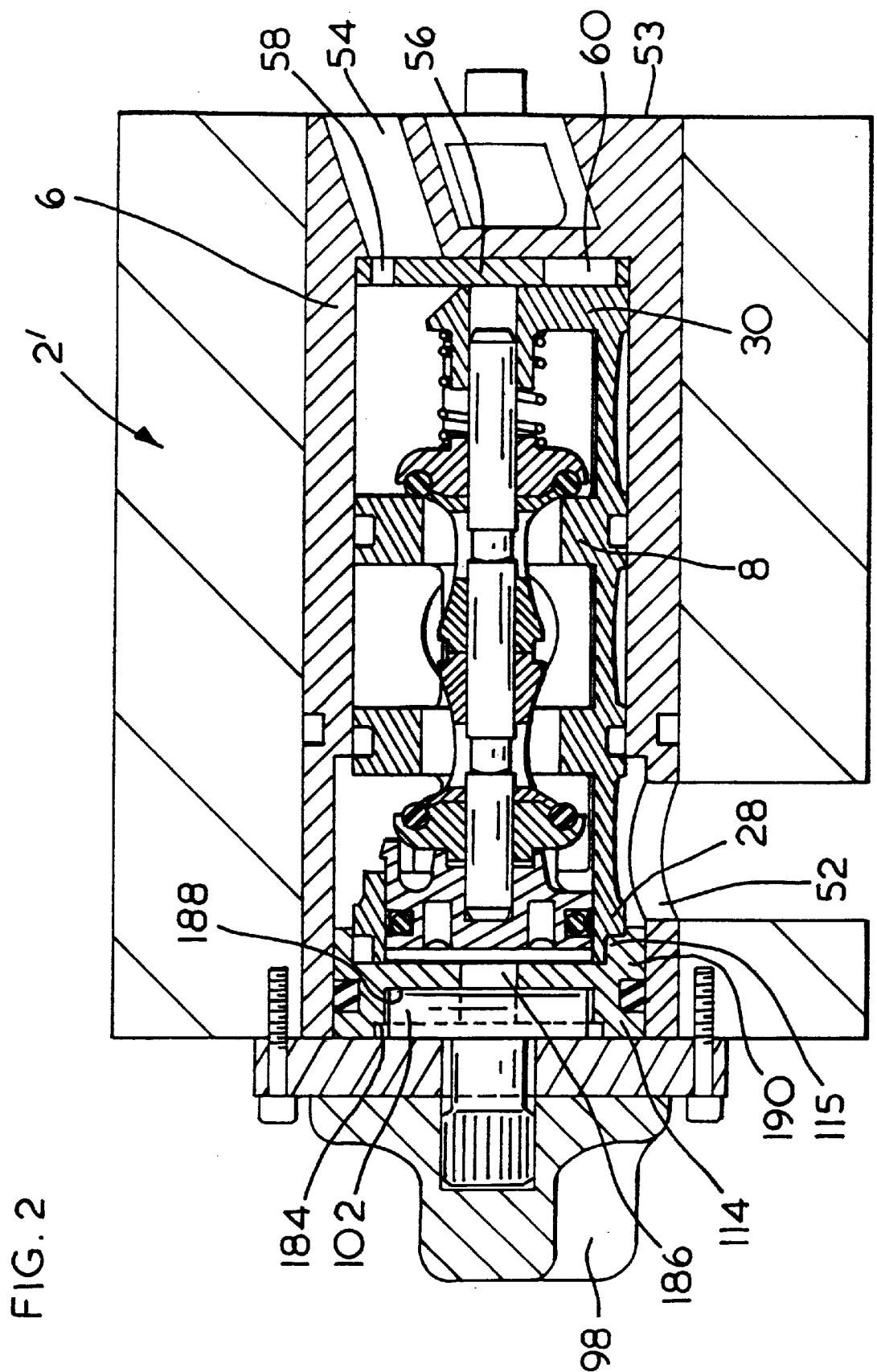
FIG. 2 shows a second valve embodying the invention.
Figure 7:
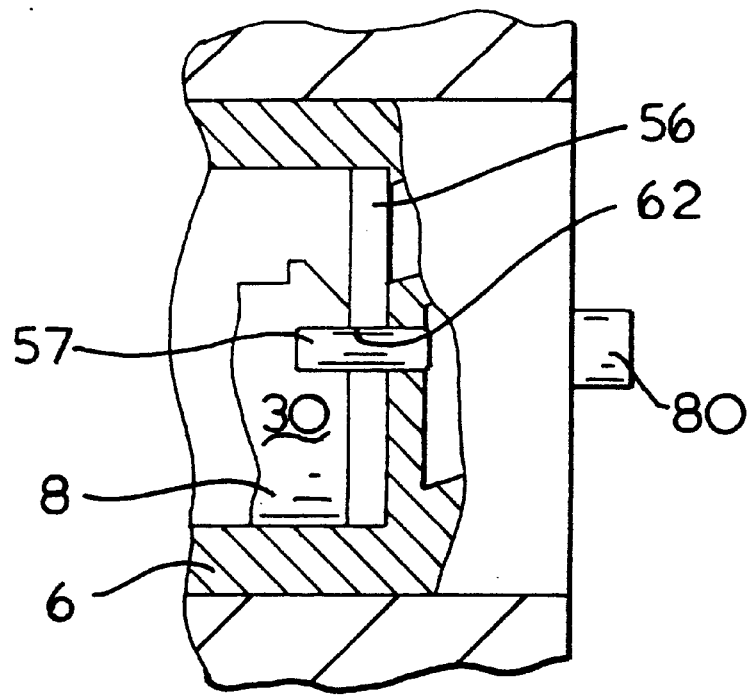
FIG. 7 shows a portion of the first valve, partly broken away.
Figure 8:
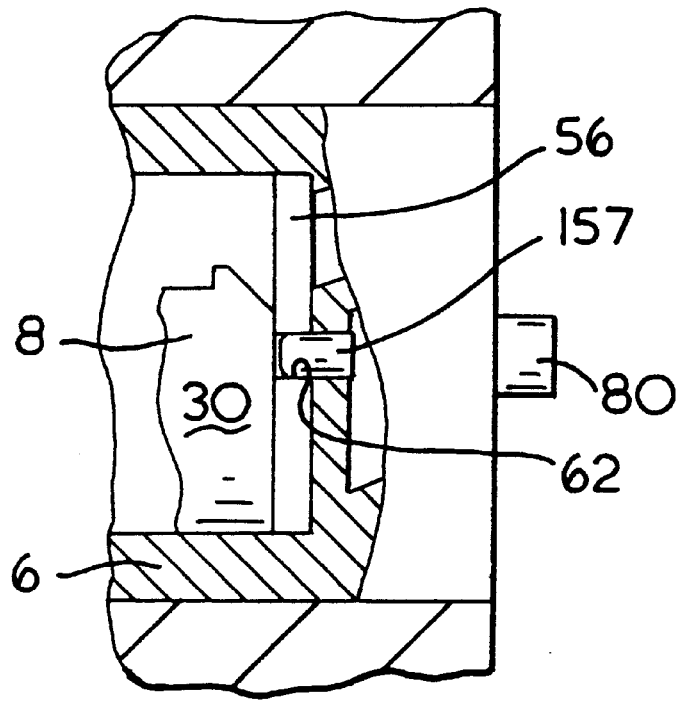
FIG. 8 shows a portion of the second valve, partly broken away.

The exhaust chamber 44 is connected to exhaust through an opening 52 in the valve cylinder 6. The inlet chamber 40 is connected to a pressure inlet passage 54 which opens to an end face 53 of the valve cylinder 6 through an aperture in a control plate 56 (FIGS. 2 and 3). The control plate 56 is in the form of a metal disc with two arcuate apertures 58 and 60, the aperture 58 being radially narrower than aperture 60 and both narrowing from one end to the other. The plate 56 also comprises two diametrically opposed notches 62. The plate 56 lies between an end face of the end portion 30 of the valve body 8, and is positioned with respect to the valve body 8 and the valve cylinder 6 by a pin 57 (FIG. 7) secured in the valve cylinder 6 and which protrudes through one of the notches 62 and into a corresponding notch in the end portion 30 of the valve body 8. The pressure inlet passage 54 opens to an inlet aperture 64 in the circular end face 53 of the valve cylinder 6.

The outlet chamber 42 is connected to a pressure outlet passage 66 through diametrically opposed openings 68 (only one of which is shown in FIG. 4) in the valve cylinder 6, through opposed milled grooves 70 in the cylinder 6 and transverse passages 72 in the valve cylinder 6 which lead to the passage 66. The pressure outlet passage 66 opens to a central outlet aperture 74 in the end face 53 of the cylinder 6.

The valve 2 is intended for use in a valve block which comprises a series of cylindrical bores (as shown at 76 in FIG. 4). An end face of bore 76 is provided with a central opening, which when the valve is in position corresponds with the central aperture 74 and leads to the consumer, i.e. the mechanism to be supplied with compressed air, and with two, diametrically opposed, arcuate apertures, one of which leads to a supply of high pressure air and one to a supply of low pressure air. The end face of the bore 76 is also provided with two diametrically opposed sockets. When the valve is in position in the bore 76 pins 80 on the end face of the valve cylinder 6 are located in these sockets, and the valve can be positioned in one of two 180° opposed positions, one with the inlet aperture 64 matching with the arcuate aperture leading to high pressure air, and the other with the inlet aperture matching with that leading to low pressure air.

Figure 6:
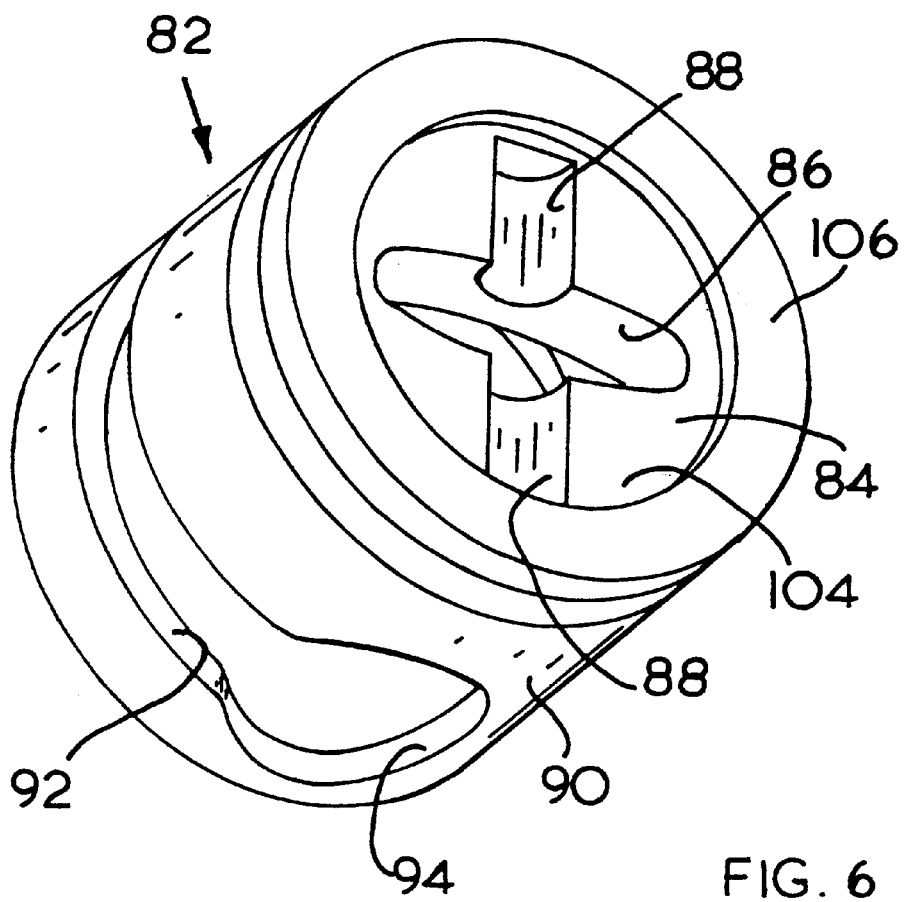
FIG. 6 shows an exhaust control sleeve of the first valve.

The valve 2 is constructed to comprise means for adjusting the flow of air to exhaust from the exhaust chamber 44. An exhaust control sleeve 82 (see FIG. 6) is positioned over an end portion of the valve body 8. The sleeve 82 comprises an end face 84 which is provided with a centrally positioned elongated aperture 86 and a cross recess 88 at 90° to the length of the aperture 86. A generally cylindrical portion 90 extends from the end face 84 and surrounds the end portion of the valve body 8. This cylindrical portion is provided with a slot 92 which extends part way around the circumference of the portion 90 from an enlarged aperture 94. The aperture 94 is the same size as the exhaust opening 52 in the valve cylinder 6, while the slot 92 extends about 270° from the aperture 94 and is progressively narrower along its length.

The valve cylinder 6 is attached to a fixing plate 96 by which the valve may be secured to the valve block 4. A knob 98 lies against the plate 96 and is connected to a stub shaft 100 which extends through the plate 96 to a cross bar 102 which lies in the cross recess 88.

Pilot air to operate the valve, i.e. to cause movement of the piston 10 against the spring 34 is provided through a passage (not shown) in the fixing plate 96 into a recess 104 (FIG. 6) bounded by the end face 84 and a rearward extension 106 of the cylindrical portion 90. The pilot air can pass through the aperture 86 from the recess 104 into a chamber 108 formed between the operating piston 14, the control sleeve 82 and the bore 29. Pilot air provided into the chamber 108 thus operates the valve piston 10 against the spring 34.

In FIG. 1, the control sleeve 82 is shown in position with the aperture 94 in the sleeve in position against the exhaust opening 52. This is the position in which a maximum flow of air to exhaust from the exhaust chamber 44 is obtained. It can be seen that by the use of the knob 98 the control sleeve 82 can be rotated to bring progressively narrower portions of the groove 92 opposite the exhaust opening 52, thus to restrict the rate of flow of air to exhaust. The valve body 8 is constrained from rotation when the knob 98 is rotated by the aforementioned pin secured in the valve cylinder 6.

FIG. 2 shows a second valve 2' embodying the invention which is similar to the valve 2 but is constructed to comprise means for adjusting the flow of air from the supply to the outlet passage. In the following description, those parts of the valve 2' which are identical to parts of the valve 2 are indicated by the same numerals.

The valve 2' differs from the valve 2 primarily in that the exhaust control sleeve 82 is removed, and the valve body 8 is rotatable within the valve cylinder 6, i.e. the pin 57 has been removed and replaced by a shorter pin 157 which is fixed in the valve cylinder 6 and lies in the notch 62 in the plate 56 with the valve body 8.

Instead of the control sleeve 82 the valve 2' comprises a sleeve 114 which fits around the end portion 28 of the valve body 8. The sleeve 114 comprises four radially spaced lugs 115 which engage in corresponding notches in the valve body 8 so that rotation of the sleeve 114 will cause rotation of the valve body.

The sleeve 114 corresponds generally to a portion of the control sleeve 82 and comprises an end face 184 which is provided with a centrally positioned elongated aperture 186 and a cross recess 188 at 90° to the aperture 186. A generally cylindrical portion 190 extends from the end face 184 and surrounds the end portion of the valve body 8.

The knob 98 again is connected to the cross bar 102 which lies in the cross recess 188. Air can be supplied to operate the piston 14 in exactly the same way as in the valve 2.

In the case of the valve 2' rotation of the knob 98 causes rotation of the valve body 8 in the valve cylinder 6, with respect to the control plate 56. This means that the effective size of the aperture in the plate 56 allowing for passage of air from the inlet passage 54 to the inlet chamber 40 can be adjusted, thus to modify the rate of flow of air to the chamber 40 by more or less of the aperture 58 being covered by the end face 30 of the valve body 8. As described the valves 2 and 2' are both normally closed.

The construction of the valve body 8 and valve piston 10 in the valves 2 and 2' is identical. The components of the valve piston 10 are of particularly simple and economic construction and are such that they may readily be assembled. Further they may also readily be assembled into a condition, as shown in FIG. 5, where they provide a normally open valve construction.

Figure 5:
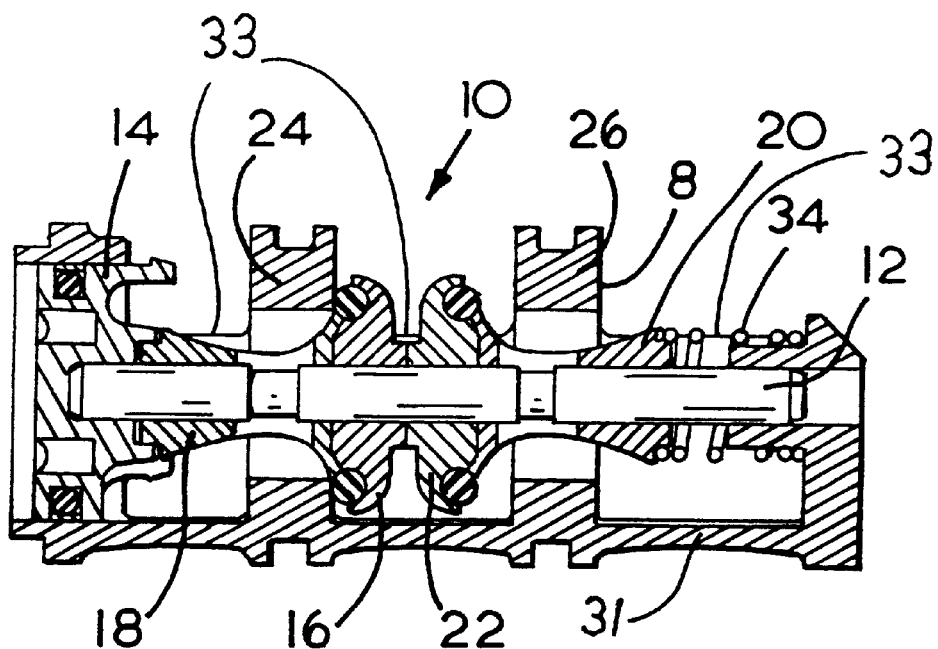
FIG. 5 shows an alternative valve body and valve piston of a valve according to the invention.

In FIG. 5, the same components as are shown in FIGS. 1 and 2 are assembled on the piston rod 12 so that the two sealing heads 16 and 22 are both positioned in the chamber between the dividing walls 24 and 26, which a first spacer 18 between the operating piston 14 and the sealing head 16, the two sealing heads abutting against each other, and a second spacer 20 between the sealing head 22 and the spring 34.

As can be seen from FIGS. 1 and 5, the two sealing elements are identical with each sealing element having a sealing head portion 16, 22 and an integral spacer or axially extending reduced diameter portion 18, 20 which is sized to pass through the central holes 36, 38 in the dividing plates 24, 26. At each end of each sealing element is an axially projecting post 19, which is sized to be forcefully inserted into an axially projecting pocket 21 on the end of the piston facing the sealing elements. The correct end of a sealing element can be forced into this pocket and the adjacent seal in elements can be bonded together with a laser device or held together with a retaining clip 23 on the piston rod 12.

The two sealing heads 16, 22 are identical. As shown, the sealing heads are separate from the spacers 18 and 20, but if desired, the sealing head 16 may be integral with the spacer 18 and the sealing head 22 integral with the spacer 20. The spacers 18 and 20 are so dimensioned as to pass freely through the apertures 36, 38 of the valve body 8.

The one-piece valve body 8 comprises three longitudinal connecting straps which interconnect the end portion 30, the two wall portions 24, 26 and the end portion 28. A first one, 31, of these straps is located at the bottom of the valve body, viewing FIG. 1 and 5. Second and third straps 33, only one of which is shown, extends slightly above the centerline of the valve body, viewing FIGS. 1 and 5. The location of the upper two straps (or struts) and the spacing between the end wall portions 28, 30 and the intermediate wall portions 24, 26 is such that, when the valve is assembled, the sealing heads and spacers, whether or not integral, can be passed through the gap between the straps and adjacent wall portions and positioned as desired in the valve body (either in the configuration of FIG. 1 or the configuration of FIG. 2) with the spacers lying in the apertures 36, 38 in the walls 24, 26. The valve is then assembled by the piston rod 12 being pushed through the sealing heads and the spacers, optionally, after the separate sealing heads and spacers, or alternatively the two integral sealing heads and spacers are assembled in the valve on the rod 12, the sealing heads and the spacers can be either welded together to each other and to the operating piston 14, preferably by ultrasonic welding or held together by a clip secured to the rod 12. The sealing heads and spacers are preferably made from polyoxymethylene (Delrin, T.M.) or from polysulpone. The piston rod 12 may be of metal or alternatively may also be of the same plastics material as the sealing heads: in the latter case, the sealing heads may be welded together by both being welded to the piston rod.

What is claimed is:

1. A pneumatic cartridge valve comprising;

a valve cylinder, a valve body in said valve cylinder, a valve piston mounted for movement in said valve body and comprising a piston rod which supports an operating piston and first and second sealing heads, said valve body comprising two dividing walls comprising apertures which walls divide said valve cylinder into three chambers, an inlet chamber, which may be connected to a supply of compressed air, an outlet chamber, which may be connected to a consumer of compressed air and an exhaust chamber, which may be connected to exhaust, said sealing heads being adapted on movement of said valve piston to open and close said apertures, said valve cylinder comprising an end face with an inlet passage adapted to be connected to said supply and an outlet passage adapted to be connected to said consumer, said valve comprising means for adjusting the flow of air from said valve to exhaust which means comprises, a control knob mounted axially of said valve body, an exhaust control sleeve mounted for rotation in said valve cylinder and connected to said control knob, said sleeve comprising a circumferential slot which leads from said exhaust chamber to an exhaust passage, rotation of said sleeve adjusting the length of the slot through which air may flow, and hence, the flow of air from said chamber to exhaust.

2. A valve for controlling the flow of air comprising:

piston means including an axial rod, and a piston supporting one end of said rod, a one piece valve body including a first end portion including means for supporting the other end of said axial rod, a second end portion including means for slidably supporting said piston, a pair of intermediate plates each having a central hole, and means for interconnecting said first and second end portions and said pair of intermediate plates in axially spaced relation, and a valve secured on said rod between said piston and said first end portion including a pair of identical plastic sealing elements, each having a radially enlarged head portion supporting an annular seal for engaging one of said intermediate plates to close its central opening, an adjacent axially elongated reduced diameter portion selectively sized to pass through the central opening of a plate and an axial hole therethrough, said one piece valve body including first opening means in between said pair of intermediate plates and second opening means between said first end portion and the adjacent intermediate plate, said first and second openings being selectively sized so that a radially enlarged head portion of one of said sealing elements can be displaced therethrough and positioned to receive said rod, one of said sealing elements being located intermediate the second of said sealing elements and said piston.

3. A valve according to claim 2, wherein said means for interconnecting said first and second end portions and said pair of intermediate plates comprises a plurality of parallel struts, the separation between two of said parallel struts being selectively chosen to define with said intermediate plates and said first end portion, said first and second opening means.

* * * * *